(12) United States Patent
Chen (10) Patent No.: US 8,418,993 B2
(45) Date of Patent: Apr. 16, 2013

(54) SYSTEM AND METHOD OF TOUCH FREE AUTOMATIC FAUCET

(76) Inventor: Chung-Chia Chen, La Habra Heights, CA (US)

( * ) Notice: Subject to any disclaimer, the term of this patent is extended or adjusted under 35 U.S.C. 154(b) by 358 days.

(21) Appl. No.: 12/714,443

(22) Filed: Feb. 27, 2010

(65) Prior Publication Data
US 2011/0210276 A1 Sep. 1, 2011

Related U.S. Application Data

(60) Provisional application No. 61/300,781, filed on Feb. 2, 2010.

(51) Int. Cl.
*F16K 31/02* (2006.01)

(52) U.S. Cl.
USPC .......................... 251/129.04; 4/623; 700/282

(58) Field of Classification Search .............. 4/302–305, 4/623; 251/129.04; 700/282
See application file for complete search history.

(56) References Cited

U.S. PATENT DOCUMENTS

| | | | |
|---|---|---|---|
| 5,548,119 A | 8/1996 | Nortier | |
| 5,549,273 A | 8/1996 | Aharon | |
| 5,694,653 A | 12/1997 | Harald | |
| 5,868,311 A | 2/1999 | Cretu-Petra | |
| 5,966,753 A * | 10/1999 | Gauthier et al. | ................... 4/623 |
| 6,019,130 A | 2/2000 | Rump | |
| 6,298,875 B1 | 10/2001 | Warshawsky et al. | |

(Continued)

FOREIGN PATENT DOCUMENTS
WO 2008094651 A1 8/2008

OTHER PUBLICATIONS

Notification of Transmittal of The International Search Report and The Written Opinion of the International Searching Authority for International Patent Application No. PCT/US2010/050146, Filed on Sep. 24, 2010 (Mailing Date Nov. 22, 2010).

(Continued)

*Primary Examiner* — Eric Keasel
*Assistant Examiner* — Ian Paquette
(74) *Attorney, Agent, or Firm* — Knobbe Martens Olson & Bear, LLP (57) ABSTRACT

A system and method of Touch Free Automatic faucet controlled by electronic sensors provides a Primary-Water-Flow-Mode, a Continue-Water-Flow-Mode, a Temperature-Control-Mode, a Faucet-Pause-Mode, an Adjust-Water-Flow-Mode and a Flow-Temperature-Default-Setting-Mode for users to control faucet water flow and water temperature without touching any parts of faucet body. The system comprises at least three electronic sensors (infrared sensors), a logical processor circuit board, an electricity power supply package, a water flow control valve assembly, a temperature control valve assembly, at least one faucet body housing and at least one inlet fluid line. From the outputs of the sensors, the logical processor responds to the flow control valve assembly and to the temperature control valve assembly to control water flow and temperature to the faucet spout. This Touch Free Automatic faucet hence provides an easy-convenient operation, water conservation and personal hygiene protection for commercial and residential applications.

25 Claims, 8 Drawing Sheets

U.S. PATENT DOCUMENTS

| | | | |
|---|---|---|---|
| 6,321,785 B1 | 11/2001 | Bergmann | |
| 6,513,787 B1 | 2/2003 | Jeromson et al. | |
| 6,753,554 B1 | 6/2004 | Gomes et al. | |
| 6,996,863 B2* | 2/2006 | Kaneko | 4/623 |
| 7,107,631 B2 | 9/2006 | Lang et al. | |
| 7,134,451 B1 | 11/2006 | Malapanes | |
| 7,326,334 B2 | 2/2008 | Boyd et al. | |
| 7,784,481 B2 | 8/2010 | Kunkel | |
| 8,006,712 B2 | 8/2011 | Boey | |
| 2006/0016902 A1 | 1/2006 | Restivo, Sr. et al. | |
| 2007/0170384 A1* | 7/2007 | Goodman | 251/129.04 |
| 2008/0256494 A1 | 10/2008 | Greenfield | |
| 2008/0271238 A1 | 11/2008 | Reeder et al. | |
| 2009/0056011 A1 | 3/2009 | Wolf et al. | |
| 2009/0119832 A1 | 5/2009 | Conroy | |
| 2009/0288712 A1 | 11/2009 | Lang et al. | |
| 2010/0108165 A1* | 5/2010 | Rodenbeck et al. | 137/801 |

OTHER PUBLICATIONS

Notification of Transmittal of The International Search Report and The Written Opinion of the International Searching Authority for International Patent Application No. PCT/US2011/22207, Filed on Jan. 24, 2011 (Mailing Date May 25, 2011).

Notification of Transmittal of The International Search Report and The Written Opinion of the International Searching Authority for International Patent Application No. PCT/US2011/023488, Filed on Feb. 2, 2011 (Mailing Date Apr. 12, 2011).

* cited by examiner

SYSTEM AND METHOD OF TOUCH FREE AUTOMATIC FAUCET

This application claims priority to U.S. Patent Application Ser. No. 61/300,781 filed on Feb. 2, 2010.

BACKGROUND

1. Field of the Invention

The present invention generally relates to the field of automatic faucets, more particularly the present invention relates to a touch free automatic faucet that uses infrared sensors in conjunction with logic processor that responds various functions to control water flow and temperature of faucet to provide an easy-convenient operation, water conservation and personal hygiene protection for commercial and residential applications.

2. Description of the Related Art

Automatic faucet has become popular for water saving and green earth. Because of the personal hygiene concern, touch free automatic faucets are ideal for public locations, commercial, residential applications.

The conventional automatic faucet is controlled with single electronic sensor to toggle on-off water flow with preset water temperature; most applications, such as kitchens, lavatories and some commercial, require adjustments on water flow, temperature and continuous water flow services.

From the above mentioned, the followings are the challenges of the touch free automatic faucets:

The first challenge to the use of an automatic faucet is the adjustment of hot-cold water flow ratio for the water temperature. The conventional automatic faucets use a static hot-cold water mixing valve for a preset water temperature; no water temperature adjustment function available for users. But in most applications, water temperature adjustment is needed and necessary, such as kitchens, lavatories and commercial applications. The current improved conventional automatic faucets with a manual hot-cold mixing handle attached on the faucet spout yet require hand-operation to adjust hot-cold water flow ratio, and not a "Touch Free" automatic faucet as claimed. Furthermore, a user can be accidently injured by sudden hot water flow of the previous handle setting.

The second challenge to the use of an automatic faucet for residential is to retain continuous water flow. For example, for the protection against the spread of disease and the water conservation, automatic faucets are installed in public restrooms such as at airports, restaurants or at commercial washstands in medical institutions. Although the advantage of the conventional touch free faucets is simply activated by placing a hand in the vicinity of the faucet spout outlet, the user must keep a hand within the sensor detection zone to keep faucet water flow to filling sink or container.

The third challenge to the use of an automatic faucet is to work in the vicinity around the faucet without triggering the water flow sensor and wasting unnecessary water flow.

The fourth challenge to the use of an automatic faucet is to adjust the water flow of faucet for different applications.

The fifth challenge to the use of an automatic faucet is to reset the water flow rate for water conservation.

The present invention is directed towards meeting these needs, among others.

SUMMARY OF THE INVENTION

The present invention generally relates to automatic sensor-based faucets and methods of operating such faucets.

The touch-free automatic faucet system in this invention comprises a touch free automatic faucet mode; wherein water flow and water temperature are controlled by a flow control valve assembly and a temperature control valve assembly in response to the electronic sensors through a logic processor circuit board. The faucet can be operated either in automatic mode or manual mode to suit all different applications.

The sensing beams of the installed primary electronic sensor (Sensor C), a pair of secondary sensors (Sensor A and Sensor B) and a pair of tertiary sensors (Sensor D and Sensor E) are pointed to different directions, at about 90 degree angle from each other to prevent interference, to control water temperature (Temperature-Control-Mode), continuous water flow (Continue-Water-Flow-Mode), faucet pause (Faucet-Pause-Mode), water flow adjustment (Adjust-Water-Flow-Mode) and default setting (Flow-Temperature-Default-Setting-Mode) for residential and commercial applications for easy-convenient operation, water conservation and personal hygiene protection.

A programmed logic processor with circuit board controls the said sensors, water flow control valve assembly and temperature control valve assembly.

As in a conventional automatic faucet operation, detection of an object in presence within the primary sensor (Sensor C) detection zone (for example, in a sink), the logic processor hence activates the flow control valve assembly (Valve A) for water flow to the faucet spout (activation of Primary-Water-Flow-Mode).

In the activation of Primary-Water-Flow-Mode, water flow control valve assembly (Valve A) is in an activated position for water flow and the primary sensor (Sensor C) senses no object in presence within the detection zone (for example, in a sink), the logic processor hence deactivates the water flow control valve assembly (Valve A) to stop water flow to the faucet spout (deactivation of Primary-Water-Flow-Mode).

At any time, both secondary sensors (Sensor A and Sensor B) sense the presence of an object (for example, a hand) within the detection zone for a time period (Time Continue-flow-on), the logic processor activates the water flow control valve assembly (Valve A) for a continuous water flow (Continue-Water-Flow-Mode) to faucet spout. This Continuous-Water-Flow-Mode operation is convenient for users to filling sink or container without keeping their hands within the detection zone of the primary sensor (Sensor C) for continuous water flow (activation of Continue-Water-Flow-Mode).

Furthermore, in the summary [005] (Primary-Water-Flow-Mode) and summary [007] (Continue-Water-Flow-Mode), wherein said water flow control valve assembly (Valve A) is in activated for water flow to faucet spout. Sensor A of secondary sensors detects the presence of object (for example, a finger) within the detection zone, the logic processor increases the faucet water flow temperature by increasing hot water flow and decreasing cold water flow of the temperature control valve assembly (Valve B) accordingly depending on the sensing time period of sensor (Sensor A); whereas Sensor B of secondary sensors senses the presence of object (for example, a finger) within the detection zone, the logic processor decreases the faucet water flow temperature by decreasing hot water flow and increasing cold water flow of the temperature control valves assembly (Valve B) accordingly depending on the sensing time period of sensor (Sensor B). Faucet water flow temperature hence is controlled by the function of the pair of secondary sensors (Sensor A and Sensor B) without touching any parts of faucet body (Temperature-Control-Mode).

Furthermore, in the summary [005] (Primary-Water-Flow-Mode) and summary [007] (Continue-Water-Flow-Mode), wherein said water flow control valve assembly (Valve A) is in activated position for water flow, Sensor D of the tertiary sensors senses the presence of object (for example, a finger) within the detection zone, the logic processor increases the water flow to faucet spout by increasing both hot and cold water flow of the water flow control valve assembly (Valve A) accordingly depending on the sensing time period of Sensor D; whereas Sensor E of the tertiary sensors senses the presence of object (for example, a finger) within the detection zone, the logic processor decreases the water flow to faucet spout by decreasing both of hot and cold water flow of the water flow control valves assembly (Valve A) accordingly depending on the sensing time period of Sensor E; faucet water flow hence is adjusted by the function of the pair of tertiary sensors (Sensor D and Sensor E) without touching any parts of faucet (Adjust-Water-Flow-Mode).

Furthermore, in the Continue-Water-Flow-Mode, water flow control valve assembly (Valve A) is activated for water flow. Both of the secondary sensors (Sensor A and Sensor B) sense the presence of object (for example, a hand) within the detection zone for a time period (Time Continue-flow-off), the logic processor deactivates the water flow control valve assembly (Valve B) to stop continuous water flow (Continue-Water-Flow-Mode) to the faucet spout (deactivation of Continue-Water-Flow-Mode).

At the stand-by condition of the faucet, primary sensor (Sensor C) senses no object presence within the detection zone and the flow control valve assembly (Valve A) is in deactivation condition, no water flow from faucet spout; detection of an object (for example, a hand or finger) within the detection zone of Sensor A of the secondary sensors for a time period (Time Sc-pause) triggers the logic processor to pause the function of primary sensor (Sensor C) referred as "Faucet-Pause-Mode". In this Faucet-Pause-Mode, a user can work within the primary sensor detection zone without activating faucet water flow for water conservation (beginning of Faucet-Pause-Mode).

In the Faucet-Pause-Mode, the primary sensor (Sensor C) is paused; Sensor A of the secondary sensors detects an object (for example, a hand or finger) within the detection zone for a time period (Time Sc-reset) triggers the logic processor to reset the function of primary sensor (Sensor C); the faucet system is back to stand-by condition (reset of Faucet-Pause-Mode).

Wherein said primary sensor (Sensor C), the pair of secondary sensors (Sensor A and Sensor B) and the pair of tertiary sensors (Sensor D and Sensor E) are hence functioned to fully control the water flow and water temperature of touch free automatic faucet for commercial and residential applications.

Wherein said water flow control valve assembly and water temperature control valve assembly having two fluid inlet (cold/hot water inlet) and one fluid outlet (mixed cold/hot water flow) conduits, combining with one or more of electric solenoid valves and electric motorized gear valves therefrom to control water flow to the faucet spout.

The default settings of water flow and temperature are programmed in logic processor through the combination function of the paired secondary sensors (Sensor A and Sensor B) and the paired tertiary sensors (Sensor D and Sensor E). The unique Default flow and Temperature Reset function hence prevent a user accidently injured by sudden hot water flow from previous usage and keep faucet water flow at a minimum requirement for water conservation.

A logic processor circuit board comprises a logic processor (Micro Chip) and a circuit board. The logic processor is programmed to function input and output of all the electronic sensors (Sensor A, Sensor B, Sensor C, Sensor D and Sensor E), water flow control valve assembly (Valve A) and water temperature control valve assembly (Valve B).

An electricity power supply package includes a battery pack and an alternating current to direct current transformer to supply direct current to the logic processor circuit board to activate the sensors, flow control valves assembly and motorized temperature control valves assembly.

As mentioned in the summary [005] and [006] (Primary-Water-Flow-Mode), the invented touch free automatic faucet provides the same convenient and water conservation functions as a conventional automatic faucet.

Whereas the summary [008] (Temperature-Control-Mode), the function of the pair of secondary sensors (Sensor A and Sensor B) controls the faucet water temperature with a "touch free" operation; and the Default Temperature Reset function prevents injury by sudden hot water flow. —Solution of Challenge 1.

Whereas the summary [007] and [010] (Continue-Water-Flow-Mode), activation of both secondary sensors (Sensor A and Sensor B) controls a continuous water flow of faucet. —Solution of Challenge 2.

Whereas the summary [011] and [012] (Faucet-Pause-Mode), Sensor A of the secondary sensors pauses the function of primary sensor (Sensor C) and hence stops water flow for user to work within the primary detection zone without activating faucet water flow for water conservation. —Solution of Challenge 3.

Whereas the summary [009] (Adjust-Water-Flow-Mode), the pair of tertiary sensors (Sensor D and Sensor E) adjusts faucet water flow. —Solution of Challenge 4.

Whereas the summary [015] (Flow-Temperature-Default-Setting-Mode), the water flow and temperature hence maintain at the most comfortable temperature and economic flow rate for water conservation. —Solution of Challenge 5.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION OF THE DRAWINGS

For the purposes of promoting an understanding of the principles of the invention, reference will now be made to the preferred embodiment and specific language will be used to describe the same. The drawings depict illustrative embodiments that are not intended to limit or restrict the scope of the invention.

An illustrative embodiment of the present invention provides a lavatory-kitchen-type faucet that can be fully functioned for all operational needs. In order to provide water-efficient operation that is easy and convenient to use, the water is activated and deactivated in response to a primary electronic sensor that detects an object presence under the spout, so as to provide the most water-efficient operation in Primary-Water-Flow-Mode. For other applications, such as filling the sink, container or washing dishes, food etc. continuous water flow is needed. The invented faucet can be switched in/out a Continue-Water-Flow-Mode without touching any parts of faucet body. Hence the personal hygiene is protected. In addition, in the uniquely designed Faucet-Pause-Mode the user can work in the vicinity of the faucet without water running. Furthermore, the two pairs of sensors are functioned in Adjust-Water-Flow-Mode and Temperature-Control-Mode to adjust water flow and temperature. Another unique Flow-Temperature-Default-Setting-Mode function provides a default water flow setting and a default water temperature setting to prevent users accidently injured by sudden hot water flow from previous usage and also to keep faucet water flow at a minimum requirement for water conservation.

The following figures and drawings description of embodiments of the invention illustrating the above mentioned functions of this invention.

Figure 1:
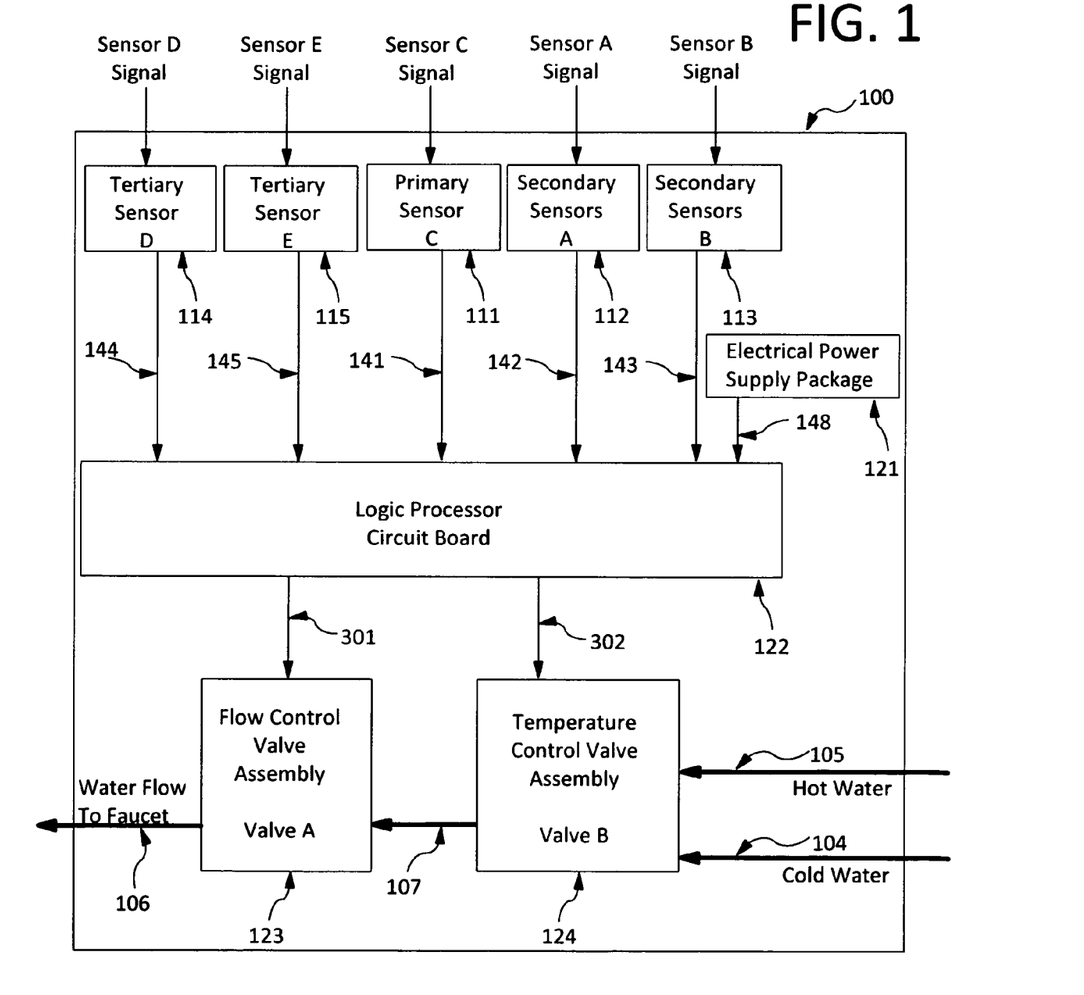
FIG. 1 is a block diagram illustrating embodiments of the touch-free automatic faucet system in this invention.

FIG. 1 is a block diagram of an illustrative touch free automatic faucet according to the present invention. The illustrative touch-free automatic faucet system (100) is shown coupled to a cold water source (104), a hot water source (105) and an outlet mixed water flow to faucet (106). The system (100) includes one primary electronic sensor (111), a pair of secondary electronic sensor assembly (112 and 113), a pair of tertiary electronic sensor assembly (114 and 115), an electrical power supply package (121), a logic processor circuit board (122), a water flow control assembly (123) and temperature control system assembly (124). The sensing signals (141, 142, 143, 144 and 145) from primary electronic sensor C (111), the pair of secondary electronic sensors A & B (112, 113) and the pair of tertiary electronic sensors D & E (114, 115) input to logic processor circuit board (122). The outputs of logic processor (301 and 302) control the water flow control assembly (123) and temperature control system assembly (124). The electricity power supply package (121) supplies electrical power (148) to logic process circuit board (122) and hence the whole system.

Figure 2:
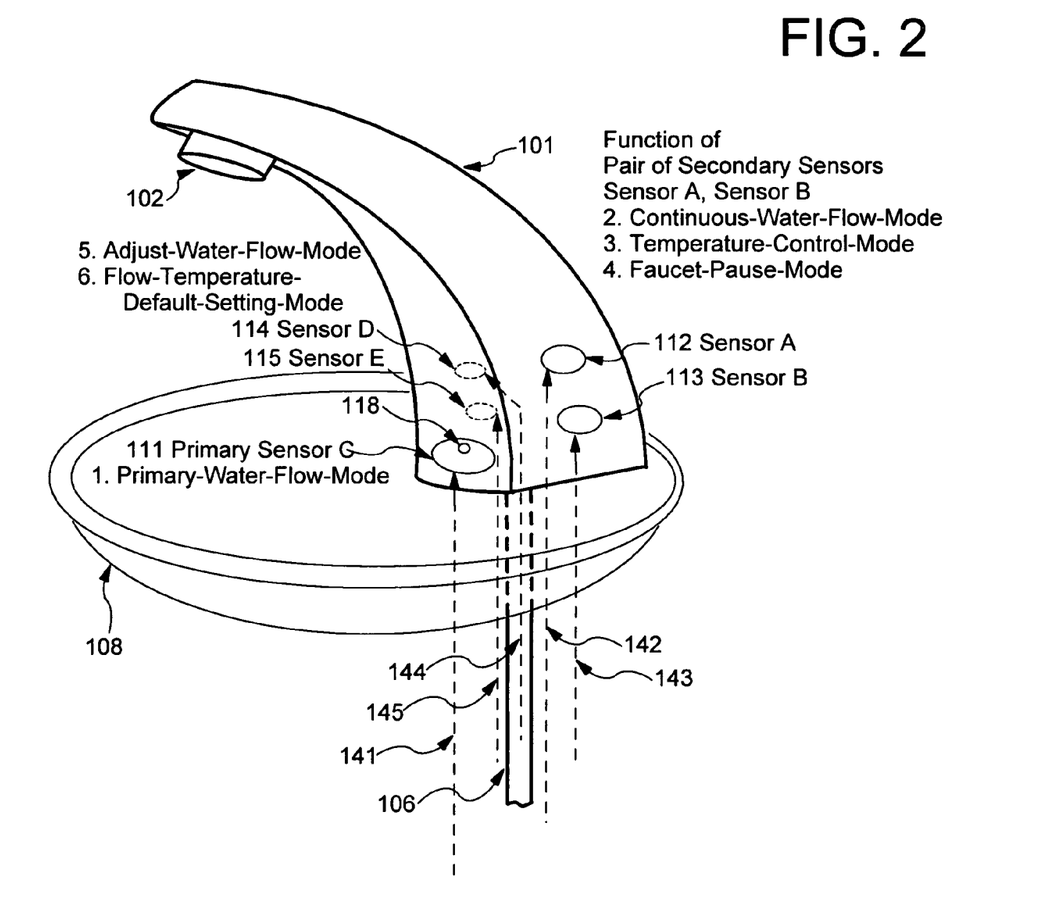
FIG. 2 is a diagram illustrating embodiments of the function of touch-free automatic faucet system in this invention.

FIG. 2 is a diagram illustrating embodiments of the functions of touch-free automatic faucet system in this invention.

The function of primary sensor C (111) is to activate Primary-Water-Flow-Mode when water needed in the sink area (108) for washing hands or foods, and etc.

The pair of secondary sensors (Sensor A) (112) and (Sensor B) (113) serves for three functions:
1. The combination functions of secondary sensors (Sensor A and Sensor B) (112 and 113) activate/deactivate a Continue-Water-Flow-Mode to filling sink, container or to wash dishes, food, and etc.
2. In the Primary-Water-Flow-Mode or Continue-Water-Flow-Mode, water flowing from the faucet; the pair of secondary sensors (Sensor A and Sensor B) (112 and 113) are functioned to adjust water temperature (Temperature-Control-Mode).

3. The primary sensor (Sensor C) (111) is in deactivation condition, activation of Sensor A (112) triggers a "Faucet-Pause-Mode" to pause function of Sensor C (111) for the user to work in the vicinity of faucet without water flowing.

The pair of tertiary sensors (Sensor D, Sensor E) (114) (115) control the water flow of faucet (Adjust-Water-Flow-Mode).

The pair of secondary sensors (Sensor A, Sensor B) (112) (113) and The pair of tertiary sensors (Sensor D, Sensor E) (114) (115) control the default setting of water flow and temperature of faucet (Flow-Temperature-Default-Setting-Mode).

Figure 3:
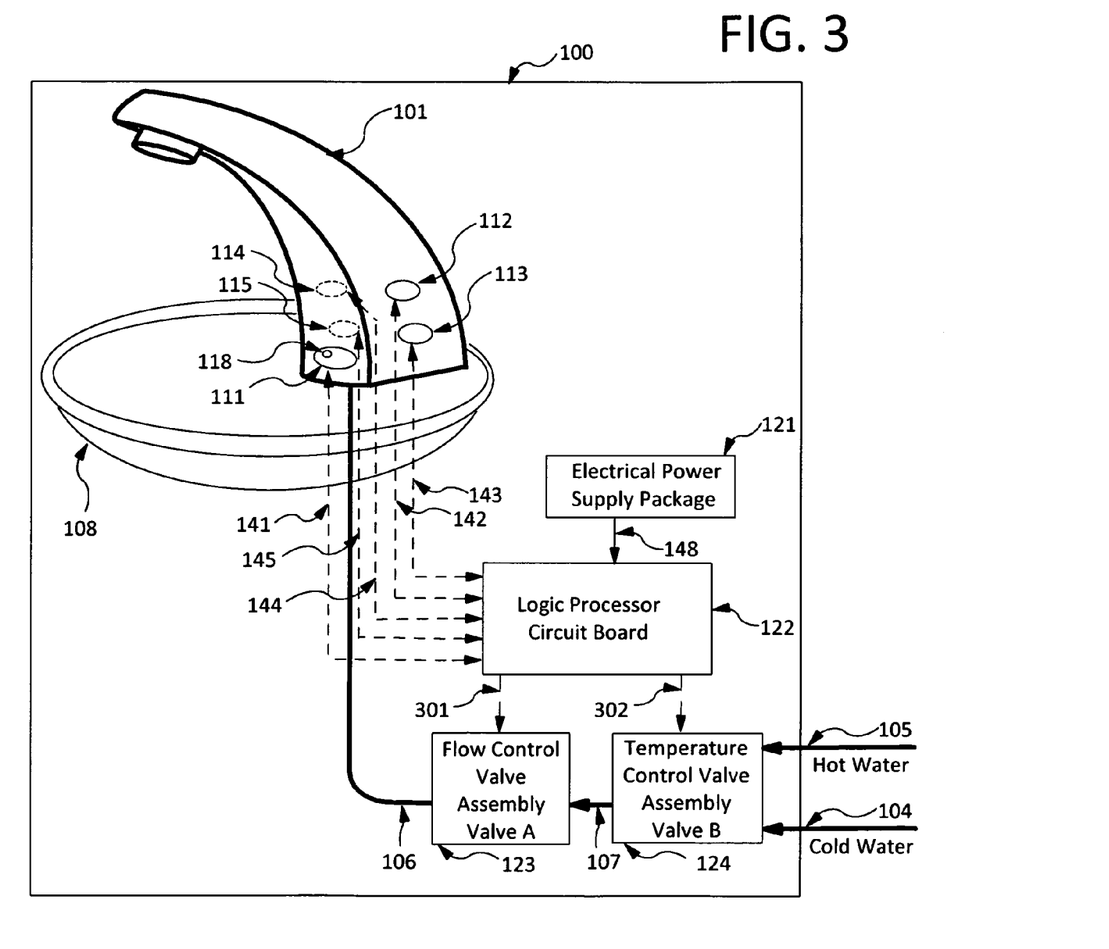
FIG. 3 is a flow diagram illustrating embodiments of the control logic of the system and method of this invention.

FIG. 3 is an illustrative embodiment lavatory-kitchen-type faucet according to the present invention. The illustrative touch-free automatic faucet system (100) is shown with a mixed water flow (106) to the faucet spout (101). Faucet spout (101) comprises one primary electronic sensor (111), a LED indicator (118), a pair of secondary electronic sensors (112 and 113) and a pair of tertiary electronic sensors (114 and 115) which are mounted on the faucet body (101). Each of these electronic sensors (111, 112, 113, 114 and 115) includes a set of infrared transmitter and receiver to detect the presence of object and a LED indicator (118) for system information indication. The primary sensor C (111) senses the sink area (108) for Primary-Water-Flow-Mode operation. The pair of secondary sensors A & B (112 and 113) and the pair of tertiary electronic sensors (114 and 115) are functioned to control Continue-Water-Flow-Mode, Temperature-Control-Mode, Faucet-Pause-Mod and Adjust-Water-Flow-Mode of the faucet (101). The faucet system (100) also includes an electricity power supply package (121) to supply the needed electrical power (148) to the control system, a logic processor circuit board (122) with preload logic program to control the faucet system (100), a water flow control valve assembly (123) and a temperature control valve assembly (124) to control water flow (301) and temperature (302).

Figure 4:
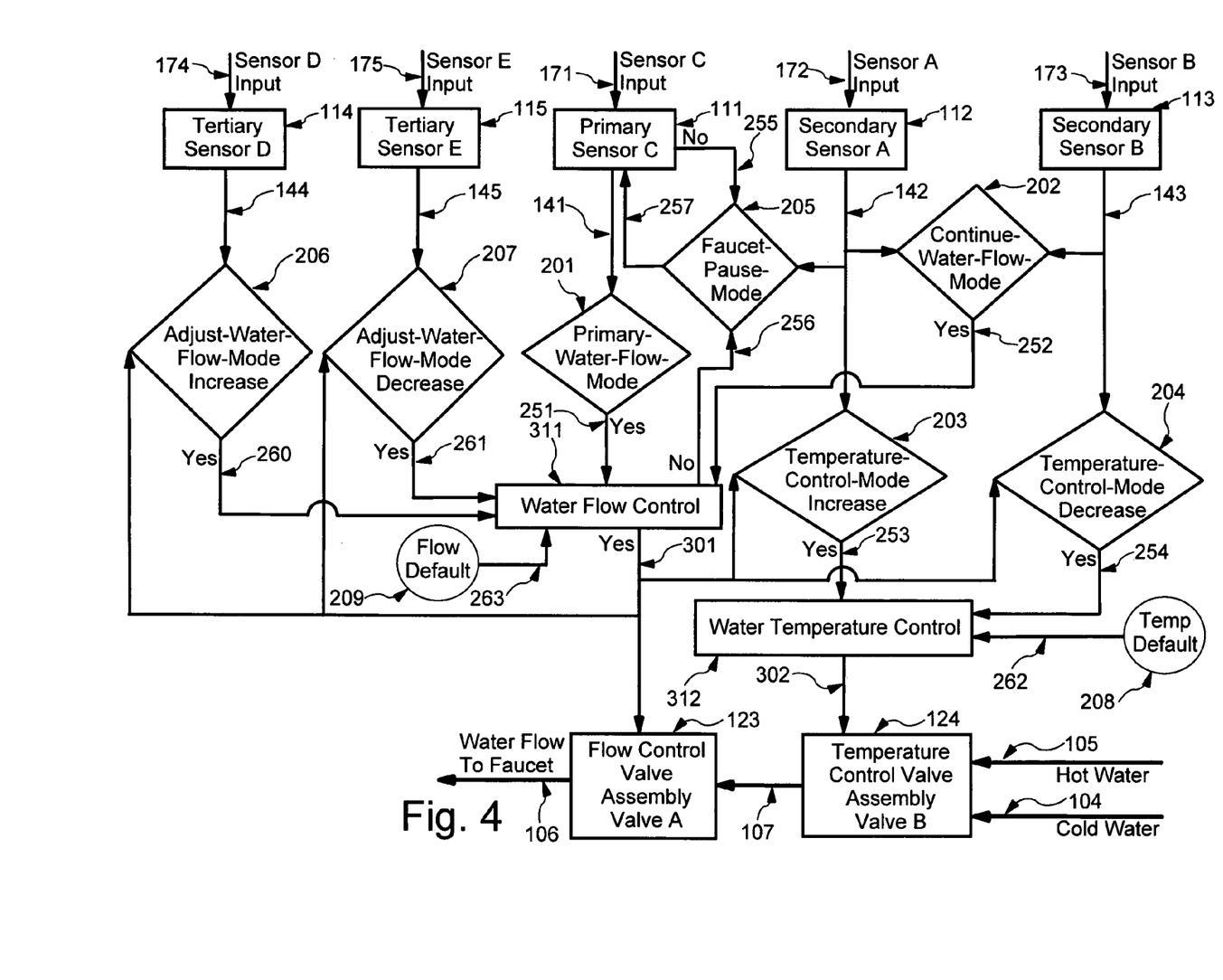
FIG. 4 is a logic flow diagram illustrating embodiments of the control logic of the system and method of this invention.

FIG. 4 is a logic diagram shows the logic procedures and method of the system using electronic sensor (infrared sensor) detecting devices, logic processor, water flow control valves for water flow and temperature control to enable "touch free" and "automatic" of faucet in the present invention.

An object in presence within the primary sensor (Sensor C) (111) detection zone (171) (for example, in a sink) activates (141) primary sensor (Sensor C) (111) and hence the logic processor (122) activates (301) the flow control valve assembly (Valve A) (123) for water flow to the faucet spout (101) (activation of Primary-Water-Flow-Mode) (201).

In the activation of Primary-Water-Flow-Mode (201) operation, water flow control valve assembly (Valve A) (123) is in activated position for water flow, whereas the primary sensor (Sensor C) (111) detects (141) no object in presence within the detection zone (171) (for example, in a sink), the logic processor (122) deactivates (301) the water flow control valve assembly (Valve A) (123) to stop water flow to the faucet spout (101) (deactivation of Primary-Water-Flow-Mode) (201).

At any time, both of the secondary sensors (Sensor A and Sensor B) (112 and 113) sense the presence of an object (for example, a hand) within the detection zone for a time period (Time Continue-flow-on) (142 and 143), the logic processor (122) activates (301) the water flow control valve assembly (Valve A) (123) for a continuous water flow (252) (Continue-Water-Flow-Mode) (202) to faucet spout (101). This Continuous-Water-Flow-Mode (202) operation is convenient for users to filling sink or container without keeping their hands within the detection zone (108) of the primary sensor (Sensor C) (111) (activation of Continue-Water-Flow-Mode) (202).

Furthermore, in FIG. 4 detail [109] (Primary-Water-Flow-Mode) (201), FIG. 4 detail [111] (Continue-Water-Flow-Mode) (202), wherein said water flow control valve assembly (Valve A) (123) is in activated position for water flow (301) to faucet spout (101). Sensor A (112) of the secondary sensors detects (142) the presence of object (for example, a finger) within the detection zone (172), the logic processor (122) increases the faucet water flow temperature by increasing hot water flow (105) and decreasing cold water flow (104) of the temperature control valve assembly (Valve B) (124) accordingly depending on the sensing time period of sensor (Sensor A) (112); whereas, Sensor B (113) of the pair of secondary sensors detects (173) the presence of object (for example, a finger) within the detection zone (143), the logic processor (122) decreases the faucet water flow temperature by decreasing hot water flow (105) and increasing cold water flow (104) of the temperature control valves assembly (Valve B) (124) accordingly depending on the sensing time period of sensor (Sensor B) (113). Faucet water flow temperature hence is controlled by the function of the pair of secondary sensors (Sensor A and Sensor B) (112 and 113) without touching any parts of faucet body (101) (Temperature-Control-Mode) (203 and 204).

Furthermore, in FIG. 4 detail [109] (Primary-Water-Flow-Mode) (201), FIG. 4 detail [111] (Continue-Water-Flow-Mode) (202), the water flow control valve assembly (Valve A) (123) is in activated position for water flow (301) to faucet spout (106). Sensor D (114) of the tertiary sensors senses (144) the presence of object (for example, a finger) within the detection zone (174), the logic processor (122) increases the water flow (260) to faucet spout (101) by increasing both hot and cold water flow of the water flow control valve assembly (Valve A) (123) accordingly depending on the sensing time period of Sensor D (144); whereas Sensor E (145) of the tertiary sensors senses (145) the presence of object (for example, a finger) within the detection zone (175), the logic processor (122) decreases the water flow (261) to faucet spout (101) by decreasing both of hot and cold water flow of the water flow control valves assembly (Valve A) (123) accordingly depending on the sensing time period of Sensor E (145); faucet water flow hence is adjusted by the function of the pair of tertiary sensors (Sensor D and Sensor E) (114 and 115) without touching any parts of faucet (101) (Adjust-Water-Flow-Mode) (206 and 207).

Furthermore, the faucet is in Continue-Water-Flow-Mode (202), water flow control valve assembly (Valve A) (123) is activated for water flow (301) to faucet spout (106). Both of the secondary sensors (Sensor A and Sensor B) (112 and 113) sense the presence of object (for example, a hand) within the detection zone (142 and 143) for a time period (Time Continue-flow-off), the logic processor (122) deactivates (301) the water flow control valve assembly (Valve B) (123) to stop continuous water flow (252) (Continue-Water-Flow-Mode) (202) (deactivation of Continue-Water-Flow-Mode) (202).

Wherein the faucet (100) is in stand-by condition, said primary sensor (Sensor C) (111) senses no object presence within the detection zone (255) and the flow control valve assembly (Valve A) (123) is in deactivation condition (301), no water flow from faucet spout (256); detection (142) of an object (for example, a hand or finger) within the detection zone of Sensor A (112) of the secondary sensors for a time period (Time Sc-pause) triggers the logic processor (122) to pause (257) the function of primary sensor (Sensor C) (111) referred as "Faucet-Pause-Mode" (205); at Faucet-Pause-Mode, a user can work within the primary sensor detection zone without activating faucet water flow for water conservation (beginning of Faucet-Pause-Mode).

In the Faucet-Pause-Mode (205), wherein said primary sensor (Sensor C) (111) is paused (257); Sensor A (112) of the secondary sensors detects (142) an object (for example, a hand or finger) within the detection zone for a time period (Time Sc-reset) triggers the logic processor to reset (257) the function of primary sensor (Sensor C) (111); the faucet system (100) is back to stand-by condition (reset of Faucet-Pause-Mode) (205).

The default settings of water flow (209) and temperature (208) are programmed in logic processor (122) through the combination function of the paired secondary sensors (Sensor A, 112 and Sensor B, 113) and the paired tertiary sensors (Sensor D, 114 and Sensor E, 115). The unique Default flow (263) and Temperature (262) Reset function hence prevent a user accidently injured by sudden hot water flow from previous usage and keep faucet water flow at a minimum requirement for water conservation.

Wherein said water flow control valve assembly (123) and water temperature control valve assembly (124) having a cold fluid inlet (104), a hot fluid inlet (105) and one fluid outlet (106) conduits, combining with one or more of electric solenoid valves and electric motorized gear valves therefrom to control water flow (106) to the faucet spout.

Wherein said primary sensor (Sensor C) (111), the pair of secondary sensors (Sensor A and Sensor B) (112, 113) and the pair of tertiary sensors (Sensor D and Sensor E) (114, 115) are hence functioned to fully control the water flow (301) and water temperature (302) of touch free automatic faucet for commercial and residential applications.

Figure 5:
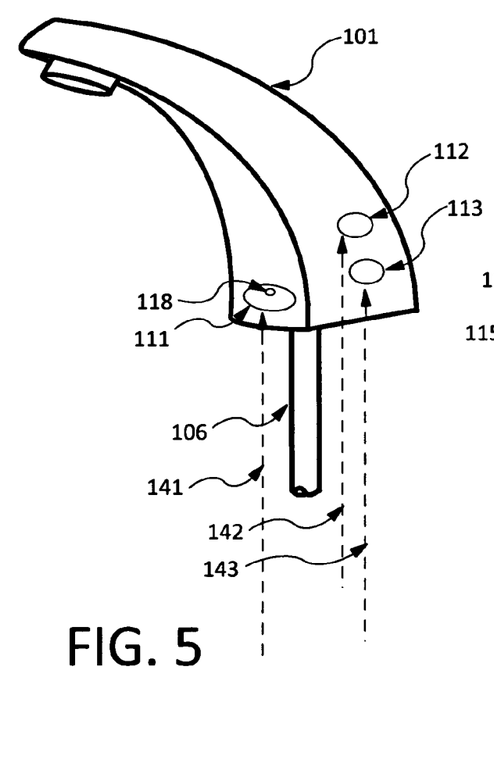
FIG. 5 and FIG. 6 illustrating embodiments of the electronic sensors on both sides of embodiment of this invention.
Figure 6:
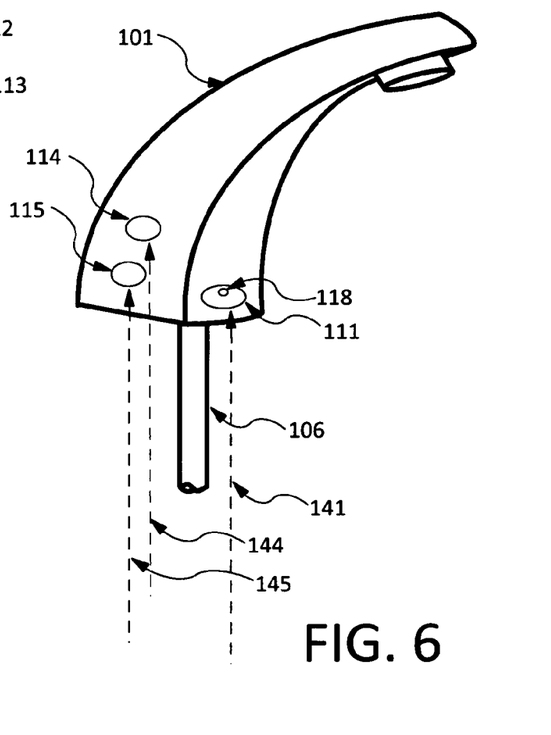

FIG. 5 and FIG. 6 illustrating embodiments of faucet, the sensing beam of the primary sensor C (111) directed to the front side of the faucet (101), the pair of secondary sensors (112 and 113) and the pair of tertiary sensors (114 and 115) are mounted on different sides of faucet body at about 90 degree angle from the primary sensor (Sensor C) (111) to prevent interference.

Figures 7, 8:
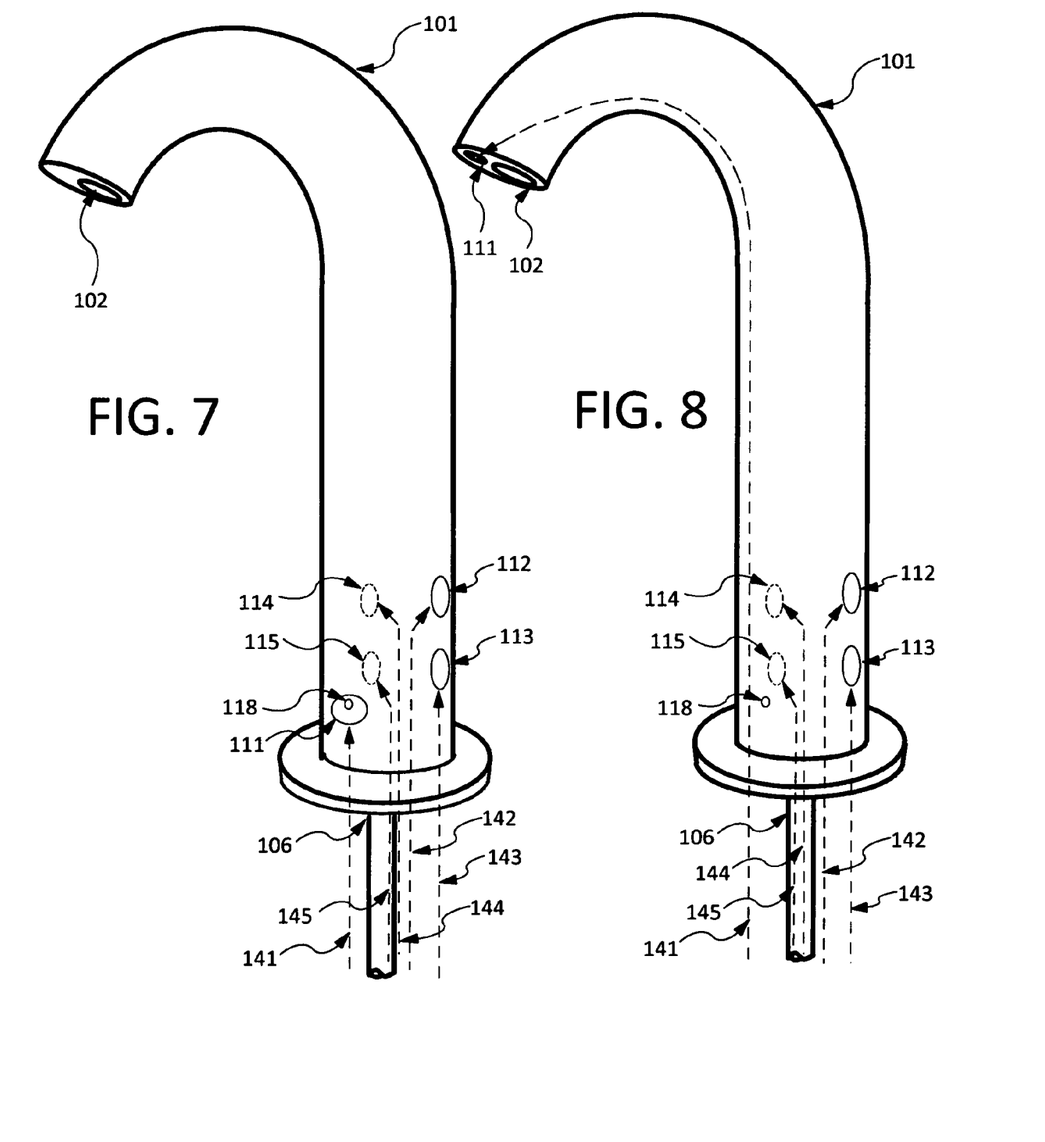
FIG. 7, FIG. 8 and FIG. 9 illustrating embodiments of different arrangements of electronic sensors of this invention.

FIG. 7 and FIG. 8 illustrating embodiments of different arrangements of electronic sensors in this invention; The primary sensor (Sensor C) (111) can be installed on the outlet of faucet spout (101) for better detection.

Figure 9:
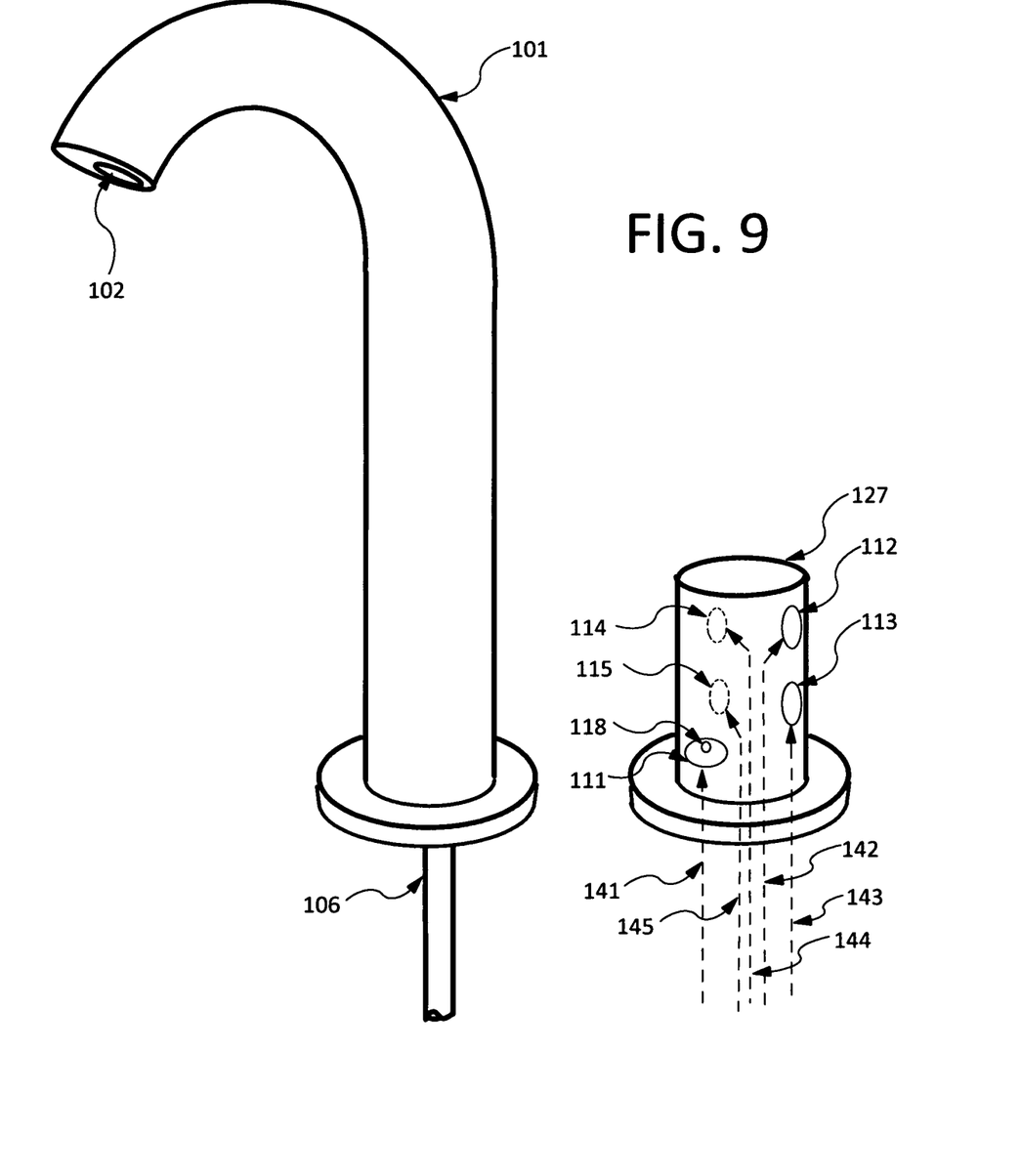

FIG. 9 illustrating embodiments of different arrangements of electronic sensors of this invention; the separate faucet sensor compartment (127) design feature provides easy-access of kitchen-lavatory applications, especially for children, handicapped and elder users etc.

Figure 10:
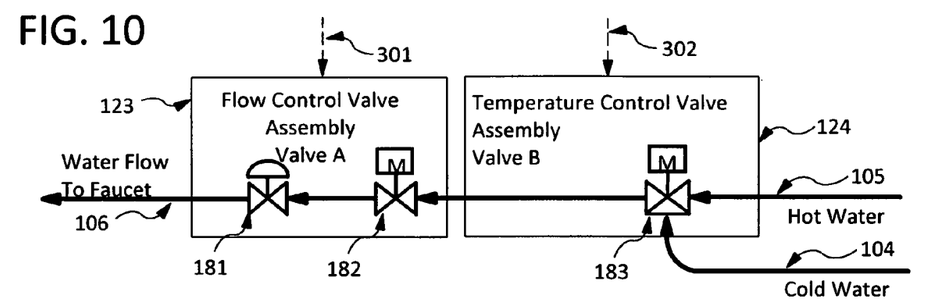
FIG. 10, FIG. 11 and FIG. 12 illustrating embodiments of different arrangements of water flow control valve assembly and temperature control valve assembly of this invention.

FIG. 10 illustrating embodiments of water flow control valve assembly (123) and temperature control valve assembly (124) in this invention. The flow control valve assembly (123) comprises a solenoid valve (181) and a motorized gear valve (182). The solenoid valve (181) receives signal (301) from logic processor to toggle on/off the valve (181) to start/stop water flow (106) to faucet spout (101). The motorized gear valve (182) adjusts the water flow (106) according to the signal input (301). The temperature control valve assembly (124) comprises a three-way motorized gear valve (183) to adjust cold/hot water flow ratio from cold water inlet (104) and hot water inlet (105) according to the input signal (302) from the output of logic processor (122).

Figure 11:
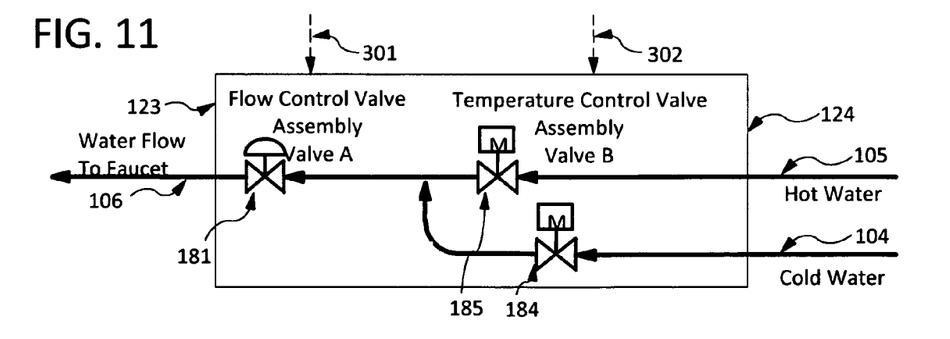

FIG. 11 illustrating another embodiments of water flow control valve assembly (123) and temperature control valve assembly (124) in this invention. The flow/temperature control valve assembly (123 and 124) comprises a solenoid valve (181) and two motorized gear valves (184 and 185). The solenoid valve (181) receives signal (301) from logic processor to toggle on/off the valve (181) to start/stop water flow to faucet spout. The water flow/temperature control valve assembly (123 and 124) comprises two two-way motorized gear valves (184 and 185) to adjust cold/hot water flow ratio from cold water inlet (104) and hot water inlet (105) according to the input signal (301 and 302) from the output of logic processor (122).

Figure 12:
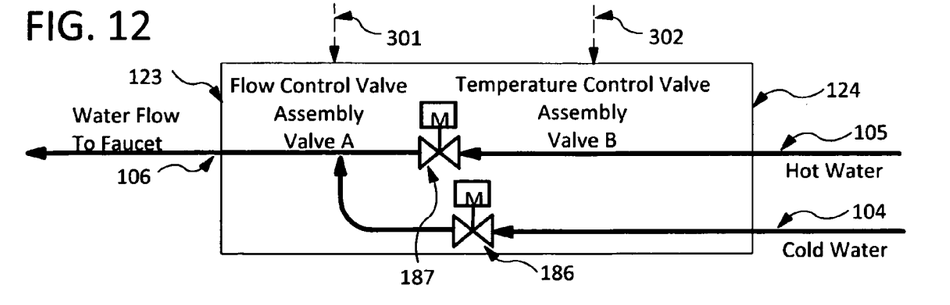

FIG. 12 illustrating another embodiments of water flow control valve assembly (123) and temperature control valve assembly (124) in this invention. The flow/temperature control valve assembly (123 and 124) comprises two two-way motorized gear valves (186 and 187) to toggle on/off and to adjust cold/hot water flow ratio from cold water inlet (104) and hot water inlet (105) according to the input signal (301 and 302) from the output of logic processor (122).

INDUSTRIAL APPLICABILITY

The invention provides a touch-free automatic faucet with three or more sensors to control water flow and temperature for commercial and residential applications for easy-convenient operation, water conservation and personal hygiene protection.

The invention claimed is:

1. A faucet apparatus for providing touch-free control of water flow, the faucet apparatus comprising:
   a spout configured to direct water flow into a sink;
   a logic processor;
   a first sensor zone comprising a first sensor, said first sensor facing the area in which the spout is configured direct water to flow, such that the first sensor is configured to detect an object in the first sensor zone and respond to the detection by providing input to the logic processor;
   a second sensor zone comprising a second sensor, said second sensor facing away from the area in which the spout is configured to cause water to flow, such that the second sensor is configured to detect an object in the second sensor zone and responds to the detection by providing input to the logic processor; and
   a third sensor zone comprising a third sensor, said third sensor facing away from the area in which the spout is configured to cause water to flow, such that the third sensor is configured to detect an object in the third sensor zone and respond to the detection by providing input to the logic processor; and
   wherein the logic processor is programmed to:
      determine whether an electronic representation of a flow state is in either a primary-water-flow-mode or a continuous-water-flow-mode;
      determine whether an electronic representation of a paused state is in either a paused-mode or a non-paused-mode;
      receive input from the first sensor indicating the presence of an object within the first sensor zone and, in response thereto, cause the spout to direct water flow while the input from the first sensor indicates that an object is present in the first sensor zone, if it is determined that the electronic representation of the paused state is in the non-paused-mode;
      cause the spout to stop directing water flow when the input from the first sensor indicates that no object is present within the first sensor zone, if it is determined that the electronic representation of the flow state is in the primary-water-flow-mode;
      receive input from the second sensor indicating the presence of an object within the second sensor zone and, in response thereto, if the electronic representation of the flow state is in the primary-water-flow-mode, change the electronic representation of the flow state from the primary-water-flow-mode to the continuous-water-flow-mode, and cause the spout to direct water flow regardless of whether an object is present in the first sensor zone;
      receive input from the second sensor indicating the presence of an object within the second sensor zone and, in response thereto, if the electronic representation of the flow state is in the continuous-water-flow-mode, change the electronic representation of the flow state from the continuous-water-flow-mode to the primary-water-flow-mode, and cause the spout to stop directing water flow unless an object is detected in the first sensor zone;
      receive input from the third sensor indicating the presence of an object within the third sensor zone and, in response thereto, if the electronic representation of the paused state is in the non-paused-mode, change the electronic representation of the paused state from the non-paused-mode to the paused-mode, thereby preventing the spout from directing water to flow regardless whether an object is present in the first sensor zone; and
      receive input from the third sensor indicating the presence of an object within the third sensor zone and, in response thereto, if the electronic representation of the paused state is in the paused-mode, change the electronic representation of the paused state from the paused-mode to the non-paused-mode.

2. The faucet apparatus of claim 1, wherein the first sensor faces away from the second sensor at about a 90 degree angle, and the first sensor faces away from the third sensor at about a 90 degree angle.

3. The faucet apparatus of claim 1, wherein the logic processor is further configured receive input from the second sensor indicating the presence of an object within the second sensor zone and, in response thereto, to either cause a change in the temperature of water directed from the spout, or to cause a change in the flow of water directed from the spout.

4. The faucet apparatus of claim 1, wherein the logic processor is further configured receive input from the third sensor indicating the presence of an object within the third sensor zone and, in response thereto, to either cause a change in the temperature of water directed from the spout, or to cause a change in the flow of water directed from the spout.

5. The faucet apparatus of claim 1, wherein the logic processor is further configured to, in response to the receipt of input from the first sensor, cause the spout to direct water at a preset temperature.

6. The faucet apparatus of claim 1, wherein the logic processor is further configured to, in response to the receipt of input from the first sensor, cause the spout to direct water at preset flow rate.

7. The faucet apparatus of claim 1, wherein the logic processor is further configured to receive input from the first sensor indicating the presence of an object within the first sensor zone for a time period and, in response thereto, cause the spout to direct water while the input from the first sensor indicates that an object is detected within the first sensor zone.

8. The faucet apparatus of claim 1, wherein the logic processor is further configured to cause the spout to stop directing water when the input from the first sensor indicates that no object has been detected within the first sensor zone for a time period.

9. The faucet apparatus of claim 1, wherein the second sensor and third sensor are each attached to a faucet sensor compartment that is separate from the spout.

10. The faucet apparatus of claim 1, wherein the first sensor comprises a first infrared receiver, the second sensor comprises a second infrared receiver, and the third sensor comprises a third infrared receiver.

11. The faucet apparatus of claim 10, wherein the first sensor comprises a first infrared transmitter, the second sensor comprises a second infrared transmitter, and the third sensor comprises a third infrared transmitter.

12. The faucet apparatus of claim 1, wherein:
the second sensor zone is defined by a first secondary sensor and a second secondary sensor;
the first secondary sensor configured to detect an object in a first detection area of the second sensor zone and the second secondary sensor configured to detect an object in a second detection area of the second sensor zone such that an object positioned in the first or second detection area can trigger the first or second secondary sensor, respectively, without triggering the other sensor.

13. The faucet apparatus of claim 12, wherein:
the first secondary sensor is configured to detect an object in the first detection area of the second sensor zone and respond to the detection by providing input to the processor, and the second secondary sensor is configured to detect an object in the second detection area of the second sensor zone and respond to the detection by providing input to the processor; and
the processor is further programmed to:
receive input from the first secondary sensor indicating the presence of an object within first detection area of the second sensor zone and, if the second secondary sensor does substantially contemporaneous provide input indicating the presence of an object within the second detection area of the second sensor zone, to cause a change in the temperature or flow of water directed from the spout;
receive input from the second secondary sensor indicating the presence of an object within the second detection area of the second sensor zone and, if the first secondary sensor does not substantially contemporaneously provide input indicating the presence of an object within the first detection area of the second sensor zone, to cause a change in the temperature or flow of water directed from the spout;
receive input from the first secondary sensor indicating the presence of an object within the first detection area of the second sensor zone and, substantially contemporaneously, receive input from the second secondary sensor indicating the presence of an object within the second detection area of the second sensor zone, and in response thereto, if the electronic representation of the flow state is in the primary-water-flow-mode, change the electronic representation of the flow state from the primary-water-flow-mode to the continuous-water-flow-mode, and cause the spout to direct water flow regardless of whether an object is present in the first sensor zone; and
receive input from the first secondary sensor indicating the presence of an object within the first detection area of the second sensor zone and, substantially contemporaneously, receive input from the second secondary sensor indicating the presence of an object within the second detection area of the second sensor zone, and in response thereto, if the electronic representation of the flow state is in the continuous-water-flow-mode, change the electronic representation of the flow state from the continuous-water-flow-mode to the primary-water-flow-mode, and cause the spout to stop directing water flow unless an object is detected in the first sensor zone.

14. The faucet apparatus of claim 12, wherein the first detection area of the second sensor zone does not overlap with the second detection area of the second sensor zone.

15. The faucet apparatus of claim 12, wherein either the first secondary sensor is the third sensor, or the second secondary sensor is the third sensor.

16. The faucet apparatus of claim 1, wherein:
the third sensor zone is defined by a first tertiary sensor and a second tertiary sensor;
the first tertiary sensor configured to detect an object in a first detection area of the third sensor zone and the second tertiary sensor configured to detect an object in a second detection area of the third sensor zone such that an object positioned in the first or second detection area can trigger the first or second tertiary sensor, respectively, without triggering the other sensor.

17. The faucet apparatus of claim 16, wherein:
the first tertiary sensor is configured to detect an object in the first detection area of the third sensor zone and respond to the detection by providing input to the processor, and the second tertiary sensor is configured to detect an object in the second detection area of the third sensor zone and respond to the detection by providing input to the processor; and
the processor is further programmed to:
receive input from the first secondary sensor indicating the presence of an object within first detection area of the third sensor zone and, if the second tertiary sensor does substantially contemporaneous provide input indicating the presence of an object within the second detection area of the third sensor zone, to cause a change in the temperature or flow of water directed from the spout;
receive input from the second tertiary sensor indicating the presence of an object within the second detection area of the third sensor zone and, if the first tertiary sensor does not substantially contemporaneously provide input indicating the presence of an object within the first detection area of the third sensor zone, to cause a change in the temperature or flow of water directed from the spout; and
receive input from the first tertiary sensor indicating the presence of an object within the first detection area of the third sensor zone and, substantially contemporaneously, receive input from the second tertiary sensor indicating the presence of an object within the second detection area of the third sensor zone, and in response thereto, if the electronic representation of the paused state is in the non-paused-mode, change the electronic representation of the paused state from the non-paused-mode to the paused-mode, thereby preventing the spout from directing water to flow regardless whether an object is present in the first sensor zone; and
receive input from the first tertiary sensor indicating the presence of an object within the first detection area of the third sensor zone and, substantially contemporaneously, receive input from the second tertiary sensor indicating the presence of an object within the second detection area of the third sensor zone, and in response thereto, if the electronic representation of the paused state is in the paused-mode, change the electronic representation of the paused state from the paused-mode to the non-paused-mode.

18. The faucet apparatus of claim 16, wherein the first detection area of the third sensor zone does not overlap with the second detection area of the third sensor zone.

19. The faucet apparatus of claim 16, wherein either the first tertiary sensor is the second sensor, or the second tertiary sensor is the second sensor.

20. A method for providing touch-free control of a faucet, the method comprising:

detecting the presence of an object within or immediately around a sink using a first sensor facing the sink and causing a faucet to direct water in response, if the faucet is not in a paused state;

detecting the absence of any object within or immediately around a sink using the first sensor and causing the faucet to cease directing water in response;

detecting the presence of an object in a second region away from the sink using a second sensor facing away from the sink and causing the faucet to direct water in response, regardless of the presence or absence of objects within or immediately around the sink;

detecting the presence of an object in the second region away from the sink using the second sensor and causing the faucet to stop directing water in response; and detecting the presence of an object in a third region away from the sink using a third sensor facing away from the sink and causing the faucet to enter a paused state in response;

said method performed at least in part by an electronic logical processor.

21. The method of claim 20, wherein causing the faucet to direct water comprises causing the faucet to direct water at a preset temperature.

22. The method of claim 20, wherein causing the faucet to direct water comprises causing the faucet to direct water at a preset rate of flow.

23. The method of claim 20, wherein the first sensor faces away from the second sensor at about a 90 degree angle, and the first sensor faces away from the third sensor at about a 90 degree angle.

24. The faucet apparatus of claim 20, wherein detecting the presence of an object within or immediately around the sink comprises detecting the presence of an object within or immediately around the sink for a predetermined time period.

25. The faucet apparatus of claim 20, wherein detecting the absence of any object within or immediately around the sink comprises detecting the absence of any object within or immediately around the sink for a predetermined time period.

* * * * *

UNITED STATES PATENT AND TRADEMARK OFFICE
CERTIFICATE OF CORRECTION

| | | |
|---|---|---|
| PATENT NO. | : 8,418,993 B2 | |
| APPLICATION NO. | : 12/714443 | |
| DATED | : April 16, 2013 | |
| INVENTOR(S) | : Chung-Chia Chen | |

It is certified that error appears in the above-identified patent and that said Letters Patent is hereby corrected as shown below:

In the Specification

At column 6, line 9, please change "The" to --the--.

At column 8, line 40, please change "The" to --the--.

In the Claims

At column 9, line 29, in Claim 1, after "configured" please add --to--.

At column 10, line 35, in Claim 3, after "configured" please add --to--.

At column 10, line 41, in Claim 4, after "configured" please add --to--.

Signed and Sealed this
Fifth Day of November, 2013

Teresa Stanek Rea
*Deputy Director of the United States Patent and Trademark Office*